Patented July 25, 1933

1,919,729

UNITED STATES PATENT OFFICE

MORRIS S. KHARASCH, OF CHICAGO, ILLINOIS, ASSIGNOR TO E. I. DU PONT DE NEMOURS & COMPANY, OF WILMINGTON, DELAWARE, A CORPORATION OF DELAWARE

SEED AND PLANT DISINFECTANT

No Drawing. Application filed October 10, 1929. Serial No. 398,817.

This invention relates to improved seed and plant disinfectant compositions containing mercury, and more particularly to such compositions that contain a double salt of diazotized amine with a mercuric salt.

Many types of organic compounds have been proposed as disinfectants for seeds and plants, the particular compound most suitable depending on the kind of seed or type of disease to be treated. For example, the mercurized phenolic compounds have been found to be very effective for many purposes.

An object of my present invention is to provide new types of seed and plant disinfectants. A further object of my invention is a seed disinfectant which besides being convenient to manufacture is also very effective for the treatment of small seeds, as well as plant diseases. Other objects will appear hereinafter.

I have now found that aromatic diazonium mercuric chloride double salts comprise an essential ingredient of a very effective disinfectant composition.

It has been the practice ordinarily to prepare the aromatic diazonium mercuric chloride double salts of the general formula

(where R is any benzenoid radical or one belonging to the naphthalene series, and X is a univalent inorganic radical such as chlorine, bromine, $OSO_3H$, $NO_3$ and the like), by treating a solution of diazonium salts with mercuric chloride. A precipitate is usually formed which is the diazonium mercuric chloride double salt.

I have now found that these products when made up into compositions comprising a substantial quantity of an inert ingredient and a lesser quantity of the foregoing salt are very effective in combating diseases of small grains.

In order to further illustrate my invention, the following examples are given, but it is to be understood that these are in no way to be taken as limitations of my invention, and while these general methods indicate how the double salts may be prepared the primary aromatic amine in general can be diazotized to give double salts with mercuric chloride and can be used for the purpose herein set forth. To recapitulate, it may be said that the radical R can be any radical whose amine $RNH_2$ can be diazotized.

*Example I.*—One mole of aniline suspended in one liter of water is treated with two and one-half moles of hydrochloric acid and to the cooled-solution (5° C.) one mole of sodium nitrite is added. To the solution of the diazonium salt thus formed, one mole of mercuric chloride dissolved in water or alcohol is then added. The addition product of the diazonium chloride mercuric chloride double salt separates:

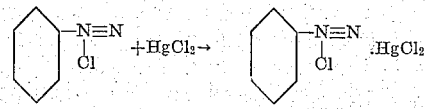

and is collected on a filter. When dry, this product is mixed with a solid inert ingredient such as sodium sulfate, talc, diatomaceous earth, tolanite, etc., so as to make a composition containing from two to ten percent of the active ingredient. This composition may be used then in the dusting of grain in proportion of two to three ounces of material to one bushel of grain.

*Example II.*—Para nitroaniline is diazotized in accordance with the method given in Example I and the diazonium salt thus formed is treated with mercuric chloride. The double salt thus formed:

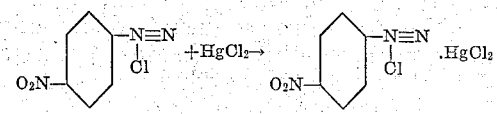

may be utilized as indicated in Example I.

*Example III.*—Ortho chloraniline is diazotized in accordance with the directions given in Example I and the product formed treated with mercuric chloride. The product is used as indicated in Example I.

*Example IV.*—Alpha naphthylamine is diazotized in the usual way and the diazonium salt thus formed treated with mercuric chloride. The double salt which separates may likewise be used as indicated in Example I.

*Example V.*—Substituted naphthylamines as well as p-toluidines can be diazotized according to methods described and the products thus formed treated with mercuric chloride to give the double salts. These double salts are very effective in the treatment of diseases of small grain.

Furthermore, I have found these disinfectant compounds may be made by a one-step process. For example, in the case of aniline, if aniline hydrochloride is mixed with an inert ingredient such as talc, put in a ball mill and subjected to the action of nitrous oxides ($N_2O_3$), the diazonium salt is formed. Solid mercuric chloride is then added and the whole ball milled for a few hours longer until the diazonium chloride mercuric chloride double salt is formed. The product is then immediately available for use without further treatment. The other compounds included in the illustrative examples may be treated in a similar manner.

In the formation of these double salts it is possible also to use mercuric salts other than chloride, such for example as the sulfate, the syanate, the acetate, etc. We ordinarily prefer, however, to use mercuric chloride. The diazonium double salts may be used as ingredients in dry dust disinfectant as indicated in the foregoing or they may be diluted with water and in this form used as sprays for foliage, etc., or they may be used in suspension with colloidal materials to prevent settling and used for the dipping of tubers such as potatoes. In some cases it may be advisable to incorporate wetting agents or dispersing agents in the disinfectant compositions, or to mix with them an absorbent material such as activated carbon in order to reduce any possible effect on the seeds themselves. In general the composition of the diazonium salts may be varied within wide limits.

In some cases it may be found advisable to incorporate in the disinfectant composition such metals as copper, mercury, or zinc, or some such reducing agent as sodium formate, since the presence of these materials may modify the action of the diazonium double salts. We may also use them in disinfecting compositions together with other disinfectants, such for example as ethyl mercuric chloride or mercurized phenols, etc.

I claim:

1. A composition of matter for the control of seed and plant diseases comprising a substantial quantity of a substantially inert solid material and a lesser quantity of the reaction products of an aromatic diazonium compound and a mercuric salt.

2. A composition of matter for the control of seed and plant diseases comprising a substantial quantity of a substantially inert solid material and a lesser quantity of the reaction products of an aromatic diazonium compound and an inorganic mercuric salt.

3. A composition of matter for the control of seed and plant diseases comprising a substantial quantity of a substantially inert solid material and a lesser quantity of the reaction products of a double salt of an aromatic diazonium compound and mercuric chloride.

4. A composition of matter in dust form for the control of seed and plant diseases comprising a substantial quantity of a substantially inert solid material and a lesser quantity of an aromatic diazonium mercuric chloride double salt having the general formula

in which R is an aromatic radical, and X is a univalent inorganic acid radical.

5. The invention of claim 1 in which 2 to 10% of the double salt of the diazonium compound is used.

6. The invention of claim 2 in which 2 to 10% of the double salt of the diazonium compound is used.

7. The invention of claim 3 in which 2 to 10% of the double salt of the diazonium compound is used.

8. The invention of claim 4 in which 2 to 10% of the double salt of the diazonium compound is used.

9. A process of making dust-like disinfectant composition containing the double salt of an aromatic diazonium compound with a mercuric salt, which comprises diazotizing an aromatic amine in the absence of a liquid diluent and effecting a further reaction in the absence of a liquid diluent between the diazotized amine and the mercuric salt.

10. A process of making dust-like disinfectant compositions containing the double salt of an aromatic diazonium compound with mercuric chloride which comprises diazotizing an aromatic amine in the absence of a liquid diluent, and effecting a further reaction in the absence of a liquid diluent between the diazotized amine and mercuric chloride.

11. A process of making dust-like disinfectant compositions containing the double salt of an aromatic diazonium compound with mercuric chloride which comprises diazotizing an aniline compound in the absence of a liquid diluent and effecting a further reaction in the absence of a liquid diluent between the diazonium salt and mercuric chloride.

12. The process of producing a disinfectant composition comprising a diazonium mercuric chloride double salt which comprises effecting a reaction between aniline hydrochloride and nitrous oxides in the absence of a liquid diluent and effecting a further reaction in the absence of a liquid diluent between the diozonium salt formed and mercuric chloride.

13. The composition of claim 1 together with a reducing agent.

14. The composition of claim 1 together with a reducing agent taken from a group consisting of copper, mercury, zinc and sodium formate.

MORRIS S. KHARASCH.